Jan. 14, 1941.   F. HUNZIKER   2,228,391
TRESTLE FOR AERIAL ROPEWAYS
Filed June 15, 1938   3 Sheets-Sheet 1

Inventor
Franz Hunziker
By Bilinger, atty.

Jan. 14, 1941.　　　F. HUNZIKER　　　2,228,391
TRESTLE FOR AERIAL ROPEWAYS
Filed June 15, 1938　　　3 Sheets-Sheet 2
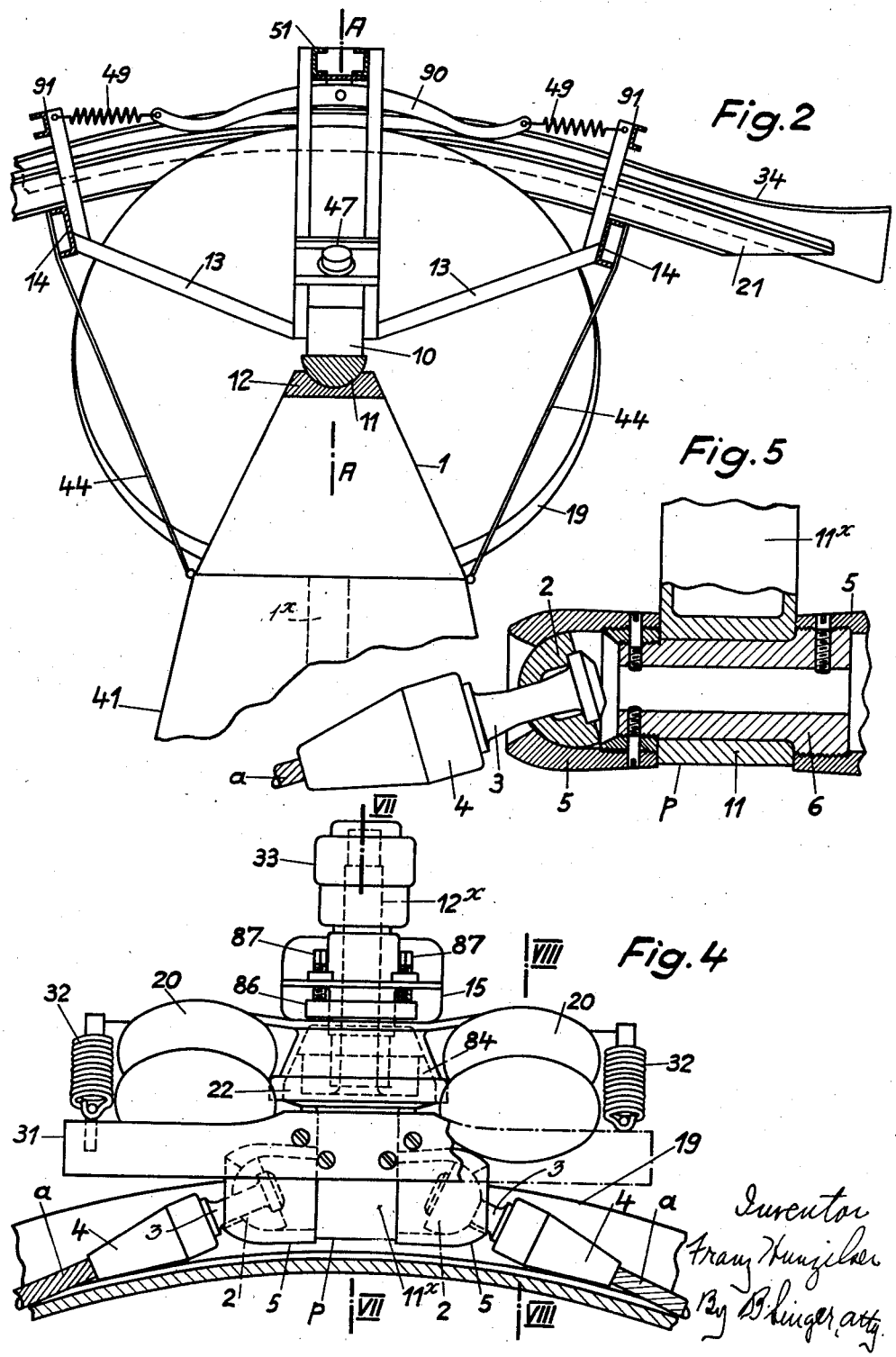

Jan. 14, 1941.  F. HUNZIKER  2,228,391
TRESTLE FOR AERIAL ROPEWAYS
Filed June 15, 1938  3 Sheets-Sheet 3

Inventor
Franz Hunziker
By Bilinger, atty.

Patented Jan. 14, 1941

2,228,391

UNITED STATES PATENT OFFICE 2,228,391

TRESTLE FOR AERIAL ROPEWAYS

Franz Hunziker, Lucerne, Switzerland

Application June 15, 1938, Serial No. 213,944
In Austria July 1, 1937

16 Claims. (Cl. 104—180)

This invention relates to a cable railway in which the sheaves of the cable are carried on supports over which one cable at least is guided together with the load baskets suspended therefrom. With the cable railways, as known heretofore, the supporting or track cables are carried at the posts or supports over guiding saddles of arcuate shape and more or less length, while the pulling or tension cables travel over smaller pulleys. The diameter of the pulleys had to be limited as much as possible up to now in view of the fact that the suspended load pendulated, that is, the suspension which connects the carrier of the load, trolley or basket with the cable itself. These suspension means must be of considerable length.

The heavier supporting or track cables slip back and forth on the guiding saddles, and hence, these expensive cables are chafed or worn to a considerable extent. The great frictional resistance in these guiding saddles becomes of importance wherever the grade varies between wide limits. The frictional resistance calls for a heavy weight in order to tension the rope and calls for a stronger construction of the posts, abutments, etc. The friction with which the cable or rope engages these saddles also decreases very greatly the tension applied to the rope, and this condition leads in serially aligned posts to increasing differences in the angle under which the cable or rope approaches the saddles and travels off these saddles. These angular distinctions for the on-running and off-running cable induce greater irregularities in the velocity. These irregularities show themselves in retardation and acceleration during the run over the posts. The conditions also lead to great fluctuations in the power required for pulling the load. The fluctuations in the power requirements then make it necessary to provide motors of greater size, and very frequently it is even necessary to provide a special station for tensioning the cable or rope. In order to eliminate these defects, it had been proposed to employ in place of the ordinary cable guiding saddles some chains or caterpillar saddles which again had the disadvantages of high installation costs, great wear and, in winter time, freezing up of the movable chains.

The smaller pulleys which support the tensioning ropes or cables again shorten the radius on the curvature of the cable or rope, and hence produce sharp bends of these cables and relatively high pressure per unit area. This has the result that the tensioning cables or ropes wear very rapidly. The smaller pulleys frequently are arranged as a plurality of serially aligned pulleys producing the so-called battery of pulleys. This has the advantage that the tensioning cable or rope is guided over a greater arc, avoiding the sharp bends and reducing the pressure per unit area. Also within recent times the pulleys had been provided with grooved rims made of rubber. These auxiliary devices, however, are still imperfect and expensive. They are intended for relatively weak cables or ropes and prove themselves valuable solely in places where the grade does not vary very much. It also should be noted that rubber is corroded by the grease or oil for the cable or rope. Where the cables are heavy and strong and have pronounced beads, the pulleys are eaten into, particularly when the pulleys are small, the injury to the pulleys depending upon the speed of the travel and the pressure per unit area.

A rope guiding means of extremely simple construction and economical as to wear and durability, which guiding means is also suitable for greater fluctuations in the grade and for heavier ropes without showing great resistance, is produced according to the present invention, by providing a single large disc disposed at an inclination or angle. This disc will then call for a single bend and stretch only, and this bend and stretch occurs over a curvature with a relatively great radius—a radius of such value that, in accordance with the experience gained thereby, it becomes non-injurious to the rope and disc. The pressure per unit area is moderate. The rim of the disc is not attacked or eaten into by the rope. This guide is suitable for tension cables operating at high speed and also for heavy traction cables. The lower margin of the inclined disc is located laterally from the greatest amplitude and swinging movement of the lower portion of the suspension means and the load recipient. It is even advisable under certain circumstances that the lower margin be located laterally of the load carrying basket itself so that these elements may travel past the posts when they are relatively short. Obviously each two inclined cable discs may be mounted on a double armed lever. It is, however, more economical and less injurious for the cable or rope to make use of a single disc of large diameter.

The invention has for an object to provide sheaves of great diameter, made possible by their inclined position, and to bring the lower margin thereof laterally to approximately the same level as the load container, so that the latter, even at its greatest swinging movement does not contact the sheave. The foot of the suspension device located on the load container and extended in a direction towards the disc is a part of the container.

It has long been recognized that the wear on the rope is less when these guide discs have a great diameter. The arc over which the rope grips the circumference of the inclined sheave is relatively short and therefore the inclined position of the sheave is of no disadvantage provided the rim of the sheave is suitably shaped.

The accompanying drawings show, somewhat diagrammatically, an embodiment of the subject matter of the invention. In order to explain the operation, this embodiment also illustrates the device for maintaining the suspension means articulated on the rope or cable. But this suspension means and locking device may also have any different suitable construction, for instance, rope gripping device, saddle clips or carriage.

In the drawings:

Fig. 2 is a side elevation thereof.

Fig. 4 is a top view in section on line IV—IV of Fig. 3 showing the pivot carrying the load.

Fig. 5 shows parts of the connecting means on a larger scale in section on line V—V.

Figure 1:
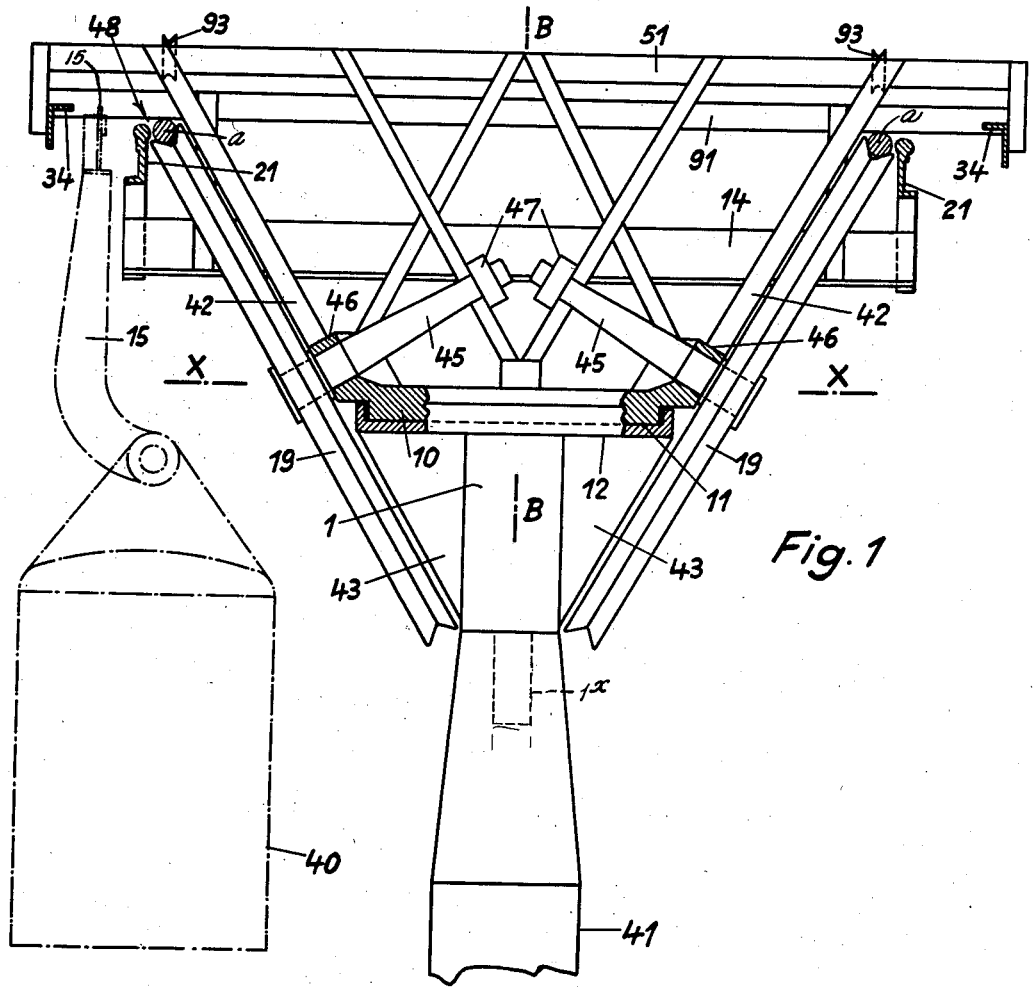
Fig. 1 is a front elevation of the upper part of the trestle, parts being shown in section
Figure 3:
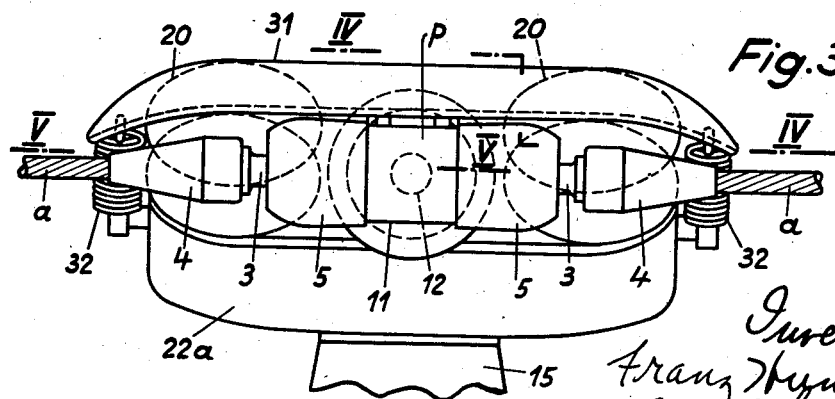
Fig. 3 shows a front view of the means of connecting the load carrier.
Figure 6:
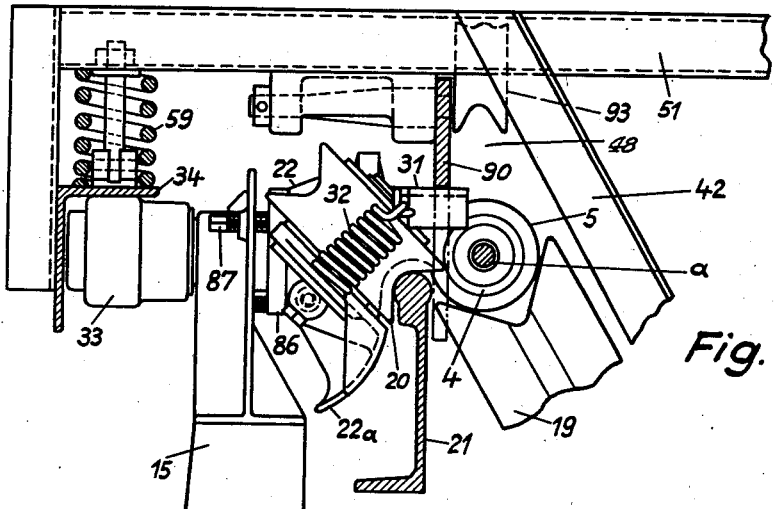
Fig. 6 illustrates in a side elevation the means connecting the load carrier to the rope, while said connecting means pass over a guide pulley.

In Figs. 1 and 2 the trestle 41, which may be of any suitable construction carries at its top an open bearing 1 in which a support 42 is rockingly mounted about the axis $x$—$x$. The support is of girder construction and is held in its position by guys or stays 44 interconnecting the support 42 with the body of the trestle 41. The support 42 is provided at its lower end with a bar 10 having partly a cylindrical bearing surface and engaging a groove 11 of semi-circular cross-section. The groove 11 is arranged in a plate 12 forming part of the bearing 1 and being fixed to the trestle 41, by brackets 43. The support 42 may be brought in any angular position with reference to the trestle 41 and secured by the stays 44. Moreover the bar 10 and therewith the whole support 42 may be shifted in the bearing 1 by displacing the bar 10 in axial direction. Braces 13 of varying thickness may be inserted between the faces of bar 10 and the end walls 14 of bearing 1. In some cases the bearing 1 may be provided with a pin $1^x$ journalled in the trestle 41 in such a manner that the support may be turned about the axis A—A. (Fig. 2.)

In the support 42 two shafts 45 are journalled in bearings 46, 47. The shafts 45 are obliquely arranged in a common plane, symmetrically to a vertical line B—B (Fig. 1). To each of the shafts 45 a sheave 19 of large diameter is fastened over which the carrying-rope $a$ runs. The lowest point of each sheave is very near the central body of the trestle 41 while the rope $a$, therewith the point of suspension of the load carrier, is at convenient distance therefrom allowing the load carrier 40 to pass freely the trestle.

The load carrier 40 is connected by a hanger 15 to a coupling member $p$ interconnecting two sections of the carrying rope $a$ in the manner of a universal joint (see Fig. 5).

On each end of the member 6 a cap 5 is fastened in which the heads of bolts 3 are rotatably arranged by means of semi-spherical bearings 2. The bolts 3 are attached to the end of a rope section by means of a connecting sleeve 4.

Figure 8:
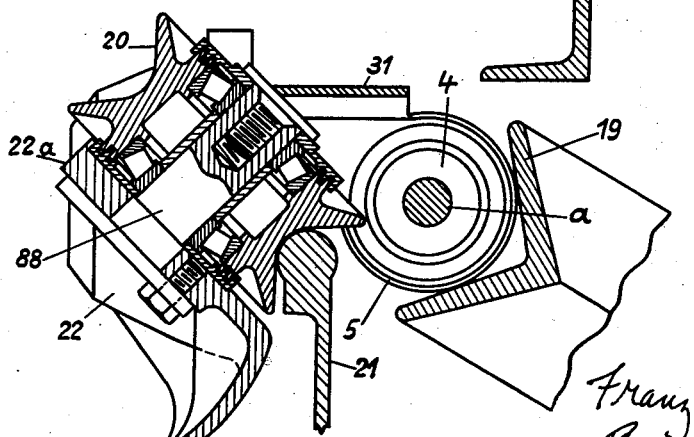
Fig. 8 is a section on line VIII—VIII of Fig. 4 showing the mounting of the load in section.

The coupling $p$ comprises an intermediate member 6 on which a sleeve $11^x$ is rotatably mounted. From the sleeve $11^x$ extends a shaft $12^x$ at a right angle to the rope. On the shaft 12 is mounted the hanger or suspension member 15 movement of the load. On the hub 80 of the suspension member 15 friction disks 81 are fixed by keys. Between consecutive disks 81 friction disks 83 are arranged which are fastened to the hollow hub 84 of sleeve $11^x$. On the hub 80 a bell shaped member 22 is movably arranged which is pressed against the hub 84 by means of a ring 86 and a screw 87. The member 22 which, by friction faces 17 is frictionally connected with the member $11^x$ forms a support for two rollers or sheaves 20 (Fig. 8). The rollers 20 are mounted on pivots 88; they co-operate with stationary curved guide rails 21 forming part of the support 42. The rollers 20 together with the rails 21 prevent hard impacts when the rope-coupling $p$ runs on to and off the sheave 19. The rollers 20 are inclined and they positively draw the rope coupling $p$ slightly out of the groove of sheave 19. The support 22 is provided with a curved guide lug 22a which lug co-operates with the rail 21 to bring the roller-support 22 automatically in position to get the rollers 20 to run on the rail 21. The roller support 22 is always held in its mid position by the fixed rail 31, secured to the member $11^x$ and the two springs 32 interconnecting the rail 31 with the support 22.

In order to prevent any transverse swing of the load carrier 40 while passing over sheave 19 there is provided at the end of the shaft 12 a guide roller 33 which bears against a rail 34 resiliently mounted on an extension 51 of the support 42 by means of spring 59. In the case of a strong transverse wind the resiliently mounted rail 34 yields so that the suspension device $p$ for the load carrier is not excessively strained.

To prevent the rope from leaving the groove of the sheave 19 even under the action of a strong wind a two armed lever 90 is rockably mounted on the support 42. The lever 90 is held in position by two springs 49 attached with one end to the lever 90 and with the others to lugs 91. The rope cannot leave the passage 48 formed between said lever 90 and the body of the support 42. The coupling $p$ which is provided with the rail 31 lifts the lever 90 by the said rail against the action of one of the springs 49 while running over the sheave 19. The lever 90 may be formed to embrace the rope and to dispose of ice and snow adhering thereto. Auxiliary rollers 93 are arranged on the support 42 to retain the rope in the grooves of the sheaves 19.

Figure 7:
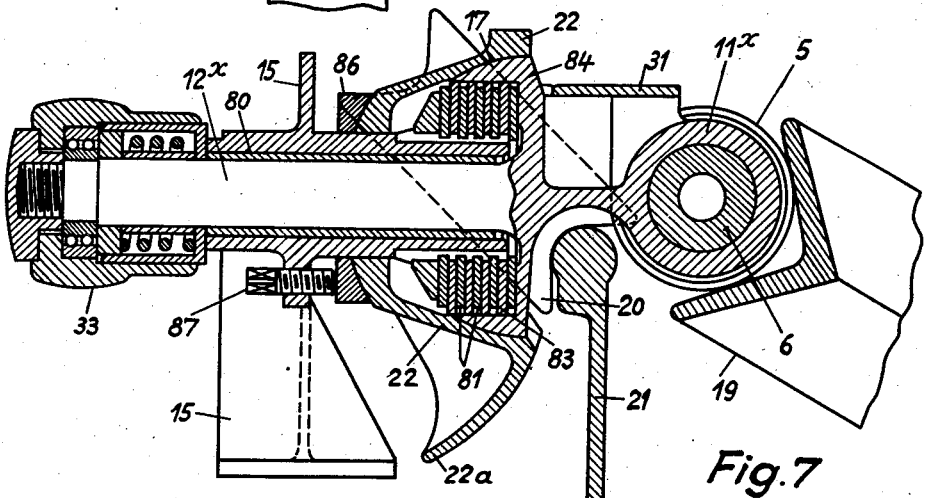
Fig. 7 is a section on line VII—VII of Fig. 4.

The present application is directed primarily to the posts for the ropeway, as shown in Fig. 1 of the drawings. It is directed to the inclined position of the sheaves 19 in a bearing 10, 12, guide tracks 21 and eventually also the parts 34, 90. The construction as illustrated in Figs. 4 to 8 has been incorporated with the present application primarily to prove the advantages of the device and the patentability of the slanting position of the sheaves 19. The brake, as shown in Fig. 7, is provided with bars 83 which are secured by a key on the element 84. The keys engage grooves in the inner circumference of the sheave 83. Discs 81 are located between the discs 83. These discs 81 have grooves along the inner margin for engagement with the keys which are secured to the part 15. All of the discs 81, 83 are displaceable axially and are forced against each other by means of a spring, not shown, in Fig. 7. This spring is located between the terminal disc x and the inner wall y of the part 22. The part 22 engages the set screw 87 by means of the ring 88. This construction, however, is entirely immaterial. Any other brake may be employed.

This application is a continuation in part of my application Ser. No. 185,750, filed January 19, 1938.

What I wish to secure by U. S. Letters Patent is:

1. Aerial ropeway comprising trestles, at least one rope, load carriers attached to said rope, sheaves to support said rope, the sheaves being inclined, the lower part thereof being nearest the body of the trestle.

2. Aerial ropeway comprising trestles, at least one rope, a support on each trestle, sheaves supporting the rope, said sheaves being rotatably mounted on said support, the sheaves being inclined the lower part thereof being nearest the body of the trestle.

3. In aerial ropeway as defined in claim 1, a support adjustably mounted on the body of the trestle, means to secure the said support in its position.

4. Aerial ropeway comprising trestles, at least one rope, a support on each trestle, sheaves supporting the rope, said sheaves being rotatably mounted in said adjustable support, the sheaves being inclined the lower part thereof being nearest the body of the trestle, load carriers, hangers to connect the load carriers to the rope, means on said support to guide said hangers, while passing over a sheave.

5. Aerial ropeway comprising trestles, at least one rope, a support on each trestle, sheaves supporting the rope, said sheaves being rotatably mounted in said adjustable support, the sheaves being inclined the lower part thereof being nearest the body of the trestle, load carriers, hangers to connect the load carriers to the rope, means on said support to guide the rope while passing on or passing off the sheaves.

6. In an aerial ropeway, wherein a rope runs over sheaves, a trestle, sheaves rotatably mounted on said trestle to lie in planes inclined upwardly-outwardly from the trestle.

7. In an aerial ropeway, a trestle, a support on the trestle, rope supporting sheaves mounted to turn on said support, said sheaves being of great diameters and lying in planes inclined upwardly-outwardly from the trestle.

8. In cable railways, wherein a cable carries a pendulous load suspension, a cable carrying and guiding sheave, and a trestle on which said sheave is supported to lie in a plane inclined upwardly-outwardly at an angle to clear the load in its pendulous movements toward and from the sheave.

9. In cable railways, wherein a cable carries a pendulous load suspension hanger, a cable carrying and guiding sheave, and a trestle on which said sheave is supported to lie in a plane inclined upwardly-outwardly at an angle to clear the load in its pendulous movements toward and from the sheave, said sheave being of a diameter greater than the length of said load suspension hanger.

10. In cable railways, wherein a cable carries a pendulous load suspension, a cable carrying and guiding sheave, a trestle on which said sheave is supported to lie in a plane inclined upwardly-outwardly at an angle to clear the load in its pendulous movements toward and from the sheave, and a support rockably adjustable on a transverse axis on said trestle in which support said sheave is mounted, the axis of the support intersecting the sheave adjacent its center.

11. In cable railways, wherein a cable carries a pendulous load suspension, a cable carrying and guiding sheave, a trestle on which said sheave is supported to lie in a plane inclined upwardly-outwardly at an angle to clear the load in its pendulous movements toward and from the sheave, and a load-suspension guide rail supported adjacent the top of the sheave between it and the load.

12. In aerial ropeways, a rope and a pendulating load suspension means and load receptacle carried thereby, the pendulating motion of the load suspension means and load receptacle being in part at least in a plane normal to the rope, a post, a sheave over which said rope and said load suspension means pass, means on said post for supporting said sheave in an inclined position with the lower margin of the sheave at such lateral distance from the load container that said container and said load suspension means will not contact the sheave within the limits of the permissible lateral swing of the load, by virtue of which a sheave of large diameter may be employed.

13. In aerial ropeways, a rope and a pendulating load suspension means and load receptacle carried thereby, the pendulating motion of the load suspension means and load receptacle being in part at least in a plane normal to the rope, a post, a sheave over which said rope and said load suspension means pass, means on said post for supporting said sheave in an inclined position with the lower margin of the sheave at such lateral distance from the load container that said container and said load suspension means will not contact the sheave within the limits of the permissible lateral swing of the load, by virtue of which a sheave of large diameter may be employed, said sheave supporting means including a shaft on which the sheave is journaled, a bar with bearings for said shaft rockably adjustable on a horizontal axis transversely disposed with respect to the direction of the rope's travel, and means for securing said bar against movement after adjustment, by virtue of which the position of the sheave may be adjusted in accordance with the grade of the ropeway as a whole.

14. In aerial ropeways, a rope and a pendulating load suspension means and load receptacle carried thereby, the pendulating motion of the load suspension means and load receptacle being in part at least in a plane normal to the rope, a post, a sheave over which said rope and said load suspension means pass, means on said post for supporting said sheave in an inclined position with the lower margin of the sheave at such lateral distance from the load container that said container and said load suspension means will not contact the sheave within the limits of the permissible lateral swing of the load, by virtue of which a sheave of large diameter may be employed, said sheave supporting means including a shaft on which the sheave is journaled, a bar with bearings for said shaft rockably adjustable on a horizontal axis transversely disposed with respect to the direction of the rope's travel, and means for securing said bar against movement after adjustment, the axis on which said bar is rockable for adjustment purposes passing approximately through the center of the sheave.

15. In aerial ropeways, a rope and a pendulating load suspension means and load receptacle carried thereby, the pendulating motion of the load suspension means and load receptacle being in part at least in a plane normal to the rope, a post, a sheave over which said rope and said load suspension means pass, means on said post for supporting said sheave in an inclined position with the lower margin of the sheave at such lateral distance from the load container that said container and said load suspension means will not contact the sheave within the limits of the permissible lateral swing of the load, by virtue of which a sheave of large diameter may be employed, said load suspension means being connected to the rope by an element, and means carried by said post by which said element and the rope are raised, when passing the post, said means comprising a guideway and rollers disposed between the rope and said load suspension means, by virtue of all of which the load suspension means and the element connecting it to the rope pass the sheave without such thrust on the sheave as would be likely to cause the rope to come off the sheave.

16. The aerial ropeway of claim 12 in which the connecting element for the suspension means forms a reinforcement on the cable and in which said connecting element and the rope itself are raised when passing the posts by means of guide elements and guideways and rollers located fore and aft of the load suspension means, said guide elements being so located with respect to the load suspension means as to absorb the reactive force which is produced by the torque resulting from the action of the load suspension means upon the rope.

FRANZ HUNZIKER.